April 21, 1959 — C. DU BOSQUE, JR — 2,883,251
SELF-LEVELING, STORING AND DISPENSING APPARATUS
Filed March 1, 1954 — 2 Sheets-Sheet 1

INVENTOR
CLAYTON DUBOSQUE JR.
BY
ATTORNEY

April 21, 1959 — C. DU BOSQUE, JR — 2,883,251
SELF-LEVELING, STORING AND DISPENSING APPARATUS
Filed March 1, 1954 — 2 Sheets-Sheet 2

INVENTOR
CLAYTON DUBOSQUE JR
BY
ATTORNEY

United States Patent Office 2,883,251
Patented Apr. 21, 1959

2,883,251

SELF-LEVELING, STORING AND DISPENSING APPARATUS

Clayton Du Bosque, Jr., New Canaan, Conn., assignor to American Machine & Foundry Company, a corporation of New Jersey Application March 1, 1954, Serial No. 413,337

3 Claims. (Cl. 312—71)

This invention relates to an improved method and apparatus for varying the capacity of automatic self-leveling and storing apparatus, and for changing the relative position of the top of the material stored in such apparatus with respect to the top of the dispenser.

In self-leveling dispensers of the type shown in U.S. Patent 2,426,995, granted to William J. Gibbs on September 9, 1947, and U.S. Patent 2,251,874, granted to William J. Gibbs on August 5, 1941 in order to change the capacity and calibration of the dispenser it was necessary to change the type and size of the counterbalancing spring. This was the only way the capacity of such units could be varied so as to permit material of one weight to be stored and dispensed at one time and for material of another weight to be stored and dispensed at another time. As a consequence, such units could only be used to store material for which they were originally designed.

It is an object of this invention to provide a simple and reliable device for varying the capacity of a self-leveling, storing and dispensing apparatus.

Another object of this invention is to provide a device for changing the position of the top layer of material on a carrier relative to the top of the apparatus.

Other objects and features of the invention will appear as the description of the particular physical embodiment selected to illustrate the invention progresses. In the accompanying drawings, which form a part of this specification like characters of reference have been applied to corresponding parts throughout the several views which make up the drawings.

This invention is equally applicable to self-leveling dispensers of the type employing compression springs or tension springs. To facilitate describing the invention, I have shown how the invention can be readily incorporated in either type of apparatus.

Figure 1:
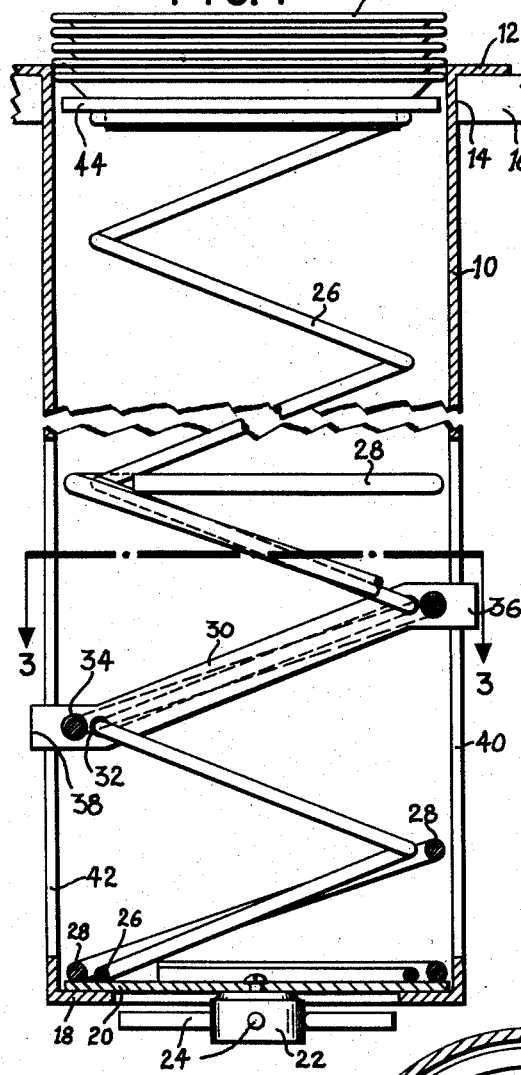
Fig. 1 is a sectional side elevation of a self-leveling, storing and dispensing apparatus incorporating a mechanism for varying the spring rate by providing means for changing the effective length of the counter balancing spring.
Figure 3:
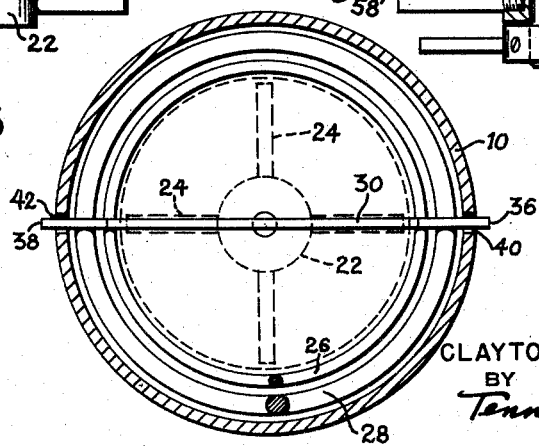
Fig. 3 is a sectional plan view of the self-leveling, storing and dispensing apparatus taken on line 3—3 of Fig. 1.

The self-leveling, storing and dispensing apparatus shown in Figs. 1 and 3 consists of a housing 10 having an outwardly extending flange 12 which supports the unit in a suitable opening 14 formed in a table or counter 16. At the lower end of the housing there is provided an inwardly extending flange 18 on which rests a turntable plate 20 to which is secured a turning knob 22 from which project a plurality of spokes 24.

In the embodiment of the invention shown in Fig. 1 there is a coiled member 28 and a coiled counterbalancing spring 26. Member 28 is of a sufficiently heavy wire so as to be substantially non-compressible while the compression spring 26 is of such thickness and design as to counterbalance a given weight of material in a manner similar to that shown in U.S. Patent No. 2,426,995. When material of a given weight and thickness is added to or removed from the carrier the spring 26 will be compressed or extended proportionally according to the weight added to or removed from the carrier so as to always maintain the top of hte material at a constant level. The lower end of spring 26 and coiled member 28 may be secured to the plate 20 by suitable means such as welding, so that whenever the plate 20 is turned the spring 26 and coiled member 28 will also be simultaneously turned therewith.

In order to store material of another weight and thickness in the apparatus, the counterbalancing spring must be of a different calibration. Heretofore this was accomplished by substituting a different counterbalancing spring of another gauge, pitch and diameter. By means of the present invention the necessity of making such a substitution of springs has been dispensed with and the utility of this type of dispensing apparatus has been immensely increased, because while heretofore it was not feasible to maintain a supply of different caliber springs, it is now possible to use the same spring and merely change its calibration. This change in calibration is accomplished by inactivating or snubbing off a portion of the spring or activating a portion of the spring that was formerly rendered inactive.

In the embodiment shown in Figs. 1 and 3 I have employed for this purpose a snubbing device 30 which is threaded onto the spring 26. This device moves up or down on the spring 26 depending on whether the spring 26 is rotated clockwise or counterclockwise by means of knob 22 when the dispenser is empty.

The snubbing member 30 has suitable holes 32 and 34 for receiving the spring 26 and the coiled inflexible member 28 respectively. The ends 36 and 38 of the snubber 30 travel up and down in slotted openings 40 and 42 formed in the shell 10.

We thus see that if the spring 26 and member 28 are rotated by means of the knob 22 the snubber support 30 will ride up or down on the spring 26 and member 28 because the ends of the support 36 and 38 are prevented from turning by their engagement with the sides of the slots 40 and 42. As the support 30 rides up or down it incapacitates that portion of the spring located between the circular holes 32 and 34 and the supporting plate 20. It will be appreciated that any other suitable device could also be used to incapacitate the spring and this particular structure is merely being used for purposes of illustrating such a device.

We thus find that the lowermost portion of the spring 26 is effectively inactivated due to the substantially rigid non-compressibility of the heavier coiled member 28, so that it is only that portion of spring 26 which extends above the slotted openings 32 and 34 that can be compressed or extended as additional material is added to or removed from the material supported on carrier platform 44 carried on the top of the spring 26.

In this manner the capacity of the apparatus may be changed so as to store material of one weight and thickness at one time and another weight and thickness at another time so that in each instance the spring 26 will rise or descend an amount corresponding to the weight added to or taken away from the material on the platform so that the top layer of material is maintained at a constant height.

Figure 2:
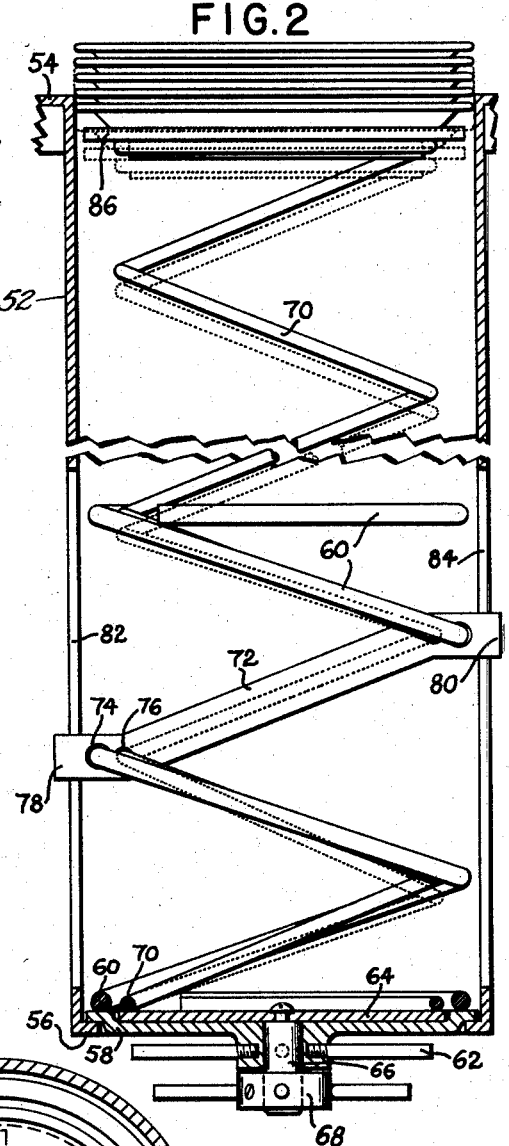
Fig. 2 is a sectional side elevation of a self-leveling, storing and dispensing apparatus incorporating a modified mechanism for changing the effective length of the counter balancing spring as well as the height of the level or starting position of the counter balancing spring.

In the embodiment of the invention shown in Fig. 2 I have provided a housing 52 which is supported in the counter 16 by means of suitable flanges 54. The lower end of the housing 52 has inwardly extending flanges 56 which support a rotatable plate 58. A heavier substantially non-compressible member 60 is secured to the plate 58. The plate 58 may be turned relative to the housing 52 by means of knob 62, which is fixed to the plate 58. A second plate 64 is supported on and is rotatable relative to the plate 58 by means of turning knob 68 which is fixedly secured to the plate 64 by means of a stud shaft 66. The calibrated counterbalancing spring 70 is fixedly secured to the turning plate 64 by suitable means such as welding.

A spring snubbing or inactivating bar 72 is threaded on the coiled member 60 and spring 70 through suitable openings 74 and 76 formed in the bar 72. The outer ends of the bar 78 and 80 ride up and down in vertically extending slots 82 and 84 formed in the housing 52.

To change the calibration of the apparatus, knobs 68 and 62 are rotated simultaneously in equal amount in the same direction. This causes the incapacitating or snubbing bar 72 to ride up or down on the spring 70 and coiled member 60 depending on the direction spring 70 and member 60 are rotated. The snubbing bar 72 is prevented from rotating because the ends of the snubbing bar 78 and 80 engage with the sides of slots 82 and 84 which restrict the bar 72 to only vertical movement.

As the bar 72 rides up or down it incapacitates a portion of the calibrated counterbalancing spring 70 by snubbing off the lower portion of the spring in a manner similar to that described in connection with Fig. 1. As previously mentioned this is due to the fact that the coiled rod 60 is of such thickness and design that it will not substantially yield to the weight that is supported on the carrier platform 86 and only the active portion of spring 70 yields under this weight. Since the effective length of this spring has been changed the calibration of the unit has likewise been changed.

To change the position of the carrier platform 86 so as to raise or lower the position of the uppermost article of material supported on the carrier platform 86 the knob 68 is held stationary while the knob 62 is rotated. By rotating knob 62, relative to knob 68, we will force the supporting bar 72 to be moved up or down, thereby increasing or decreasing the height of the spring 70 and the carrier platform 86 with respect to its normal height level. This results in a change in position of the uppermost article of material stored in the dispenser with respect to the top of the dispenser, without changing the effective length of spring 70, and hence without changing the calibration of the unit.

The height of the level of the carrier platform 86 can also be adjusted by rotating the knob 68 and holding the knob 62 stationary. The rotation of knob 68 of course effects a rotation of disc or plate 64 and also of spring 70 secured thereto. Any rotation of spring 70 due to its engagement with the stationary hold member 72 causes the coils of said spring to move through the holes 76 of member 72 in a screw or spindle-like fashion and thereby decrease or increase the length of the spring or the number of its coils between the carrier platform and the member 72. This increase or decrease of the length of the active part of the spring above member 72 effects a change in the height of the level of the carrier platform 86 and also brings about a change in the capacity of said spring.

Figure 4:
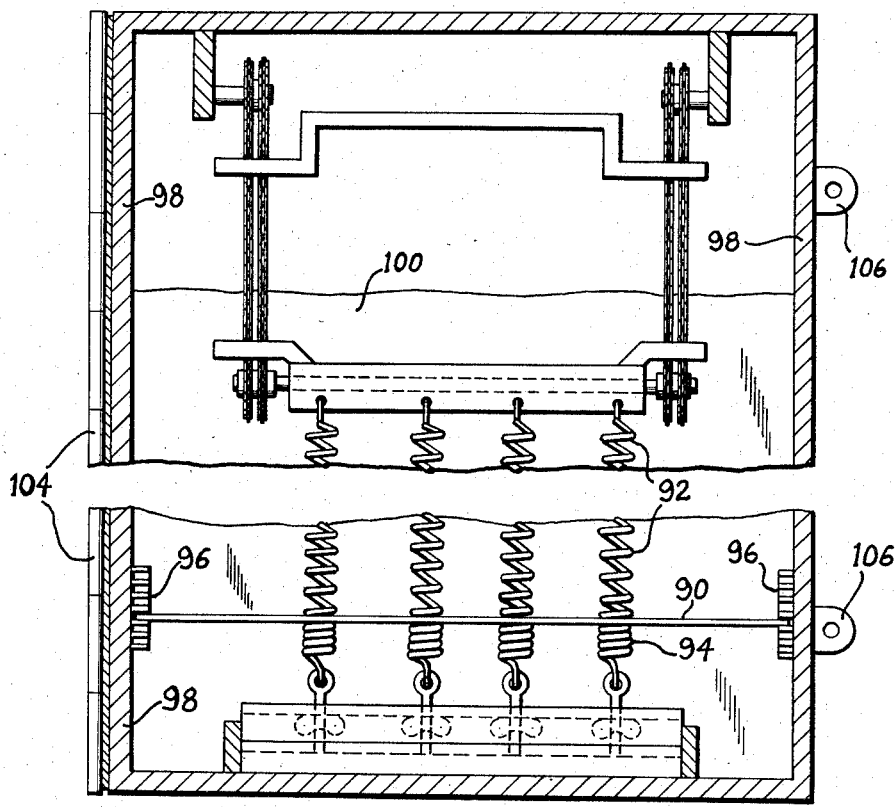
Fig. 4 is a sectional end elevation illustrating the spring adjusting means used with tension springs.
Figure 5:
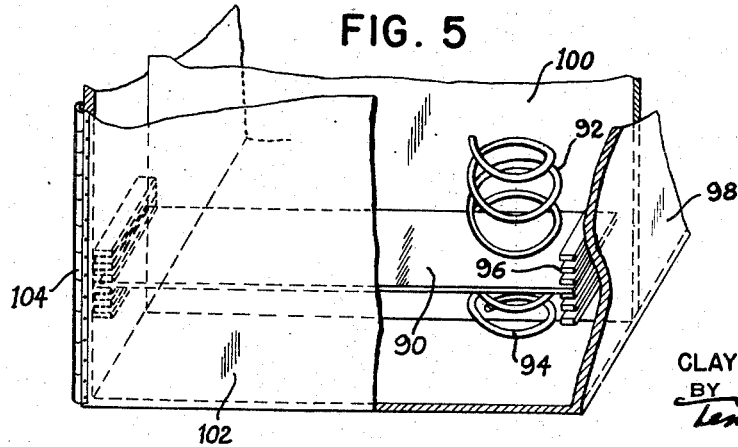
Fig. 5 is a detail isometric view illustrating the spring adjusting means in detail.

In Figs. 4 and 5 I have shown how my invention can be readily used to change the calibration of a self-leveling, storing and dispensing apparatus of the type employing tension springs such as shown in U.S. Patent 2,251,874, referred to above. In this embodiment the incapacitating plate 90 is inserted between the coils of the tension springs 92 so as to render the lowermost portion 94 of each spring 92 inactive due to the fact that the plate 90 is held free from movement by slotted holders 96 formed in the side walls 98 of the apparatus into which it is placed. The springs 92 are prevented from sliding off the incapacitating plate 90 because of their confinement between the inner wall 100 and the hinged covering plate 102. The hinged covering plate 102 is held in position at one side by the hinge 104 and at the other side by means of a suitable latch 106.

Whenever it is desired to change the calibration of the self-leveling dispenser, the covering plate 102 is opened and the plate 90 is removed from the slots 96 and reinserted in other slots so as to incapacitate a different number of spring coils. In this manner the capacity of the self-leveling dispenser is changed. In general the more coils that are incapacitated the greater the capacity of the self-leveling dispenser and the lesser the number of coils that are incapacitated the lesser the capacity of the dispenser. It will be apparent that there are many other ways one could employ for incapacitating a portion of the coils of the tension spring and this embodiment of the invention constitutes only one way of accomplishing such incapacitation.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. A self-leveling, storing and dispensing apparatus comprising a housing, a calibrated counter-balancing compression spring supported in said housing, a material supporting carrier mounted on the upper end of said compression spring for supporting material stored in said apparatus, a coiled substantially non-extendible or compressible member having substantially the same pitch as said first mentioned spring, the coils of said member extending adjacent the coils of said spring, an adjusting member for rotating the lower ends of said spring and member, a snubbing member interconnecting a portion of the coils of said coiled member with a portion of the coils of said spring to prevent relative movement therebetween to thereby inactivate a portion of said counterbalancing spring, means for preventing said snubbing member from rotating relative to said housing, and a sliding connection between said snubbing member and said compression spring and said non-extensible member whereby the turn of the non-extensible member controls the amount of spring inactivated by said snubbing member.

2. A self-leveling, storing and dispensing apparatus comprising a housing, a calibrated counter-balancing compression spring supported in said housing, a material supporting carrier mounted on the upper end of said compression spring for supporting material stored in said apparatus, a coiled substantially non-extendible and non-compressible member having substantially the same pitch as said first mentioned spring, the coils of said member extending adjacent the coils of said spring, a snubbing member having a sliding connection interconnecting a portion of the coils of said coiled member with a portion of the coils of said spring to prevent relative movement therebetween to thereby inactivate a portion of said counterbalancing spring, means restraining said snubbing member to non-rotary up and down movement, and means for changing the position said snubbing member engages with said coiled member and spring by rotating said spring and member to inactivate a different portion of the calibrated spring to thereby change the calibration of the self-leveling, storing and dispensing apparatus.

3. A self-leveling, storing and dispensing apparatus comprising a material supporting carrier, a housing in which said carrier is mounted for free up and down movement, a calibrated compression spring mounted inside of said housing for yieldably supporting and counter-balancing said carrier to maintain the top of the material supported thereon at a constant level, a second spiraling member mounted to spiral adjacent said counter-balancing spring, said second spiraling member being substantially inflexible and of the same pitch as said compression spring, a slidable means slidably mounted on said second spiraling member and interconnected with said compression spring to maintain the portion of said compression spring held by said means inflexible, said slidable means being restricted to up and down movement relative to said housing, and means coacting with said second spiraling member to raise and lower said slidable means relative to said spring to change the portion of said calibrated compression spring that is rendered inactive by said slidable means to change the compression rate of said spring.

References Cited in the file of this patent
UNITED STATES PATENTS

| | | |
|---|---|---|
| 973,641 | Dysart | Oct. 25, 1910 |
| 1,023,490 | Beck et al. | Apr. 16, 1912 |
| 1,116,268 | Hansen | Nov. 3, 1914 |
| 2,251,876 | Gibbs | Aug. 5, 1941 |
| 2,560,928 | Bockius | July 17, 1951 |
| 2,609,265 | Larsen | Sept. 2, 1952 |

FOREIGN PATENTS

| | | |
|---|---|---|
| 24,917/35 | Australia | Sept. 2, 1936 |